United States Patent
Dubay et al.

(10) Patent No.: US 10,717,457 B2
(45) Date of Patent: Jul. 21, 2020

(54) STEERING COLUMN POSITIVE LOCK MECHANISM

(71) Applicant: STEERING SOLUTIONS IP HOLDING CORPORATION, Saginaw, MI (US)

(72) Inventors: Robert W. Dubay, Saginaw, MI (US); Damian Z. Gostyla, Bay City, MI (US); Devin M. King, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 134 days.

(21) Appl. No.: 16/010,645

(22) Filed: Jun. 18, 2018

(65) Prior Publication Data
US 2019/0382043 A1   Dec. 19, 2019

(51) Int. Cl.
*B62D 1/184* (2006.01)
*B62D 1/189* (2006.01)

(52) U.S. Cl.
CPC ............. *B62D 1/184* (2013.01); *B62D 1/189* (2013.01)

(58) Field of Classification Search
CPC . B62D 1/184; B62D 1/189; F16B 7/14; F16B 7/1454; F16B 7/1472
See application file for complete search history.

(56) References Cited

U.S. PATENT DOCUMENTS

| | | | | |
|---|---|---|---|---|
| 4,938,093 A * | 7/1990 | Matsumoto | ........... | B62D 1/183 74/493 |
| 5,570,610 A * | 11/1996 | Cymbal | ................. | B62D 1/184 74/493 |
| 5,722,299 A * | 3/1998 | Yamamoto | ............ | B62D 1/184 280/775 |
| 5,743,150 A * | 4/1998 | Fevre | ..................... | B62D 1/184 280/775 |
| 5,871,233 A * | 2/1999 | Tanaka | ................... | B62D 1/184 280/777 |
| 6,092,957 A * | 7/2000 | Fevre | ..................... | B62D 1/184 280/775 |
| 6,139,057 A * | 10/2000 | Olgren | .................. | B62D 1/184 280/775 |
| 6,390,717 B1* | 5/2002 | Bar | ........................ | B62D 1/184 280/775 |
| 6,419,269 B1* | 7/2002 | Manwaring | ............ | B62D 1/184 280/775 |
| 6,659,504 B2* | 12/2003 | Riefe | ..................... | B62D 1/184 280/775 |
| 7,150,204 B2* | 12/2006 | Uphaus | ................. | B62D 1/184 74/493 |
| 7,484,430 B2* | 2/2009 | Schulz | .................. | B62D 1/184 280/777 |

(Continued)

*Primary Examiner* — Paul N Dickson
*Assistant Examiner* — Timothy Wilhelm
(74) *Attorney, Agent, or Firm* — Dickinson Wright PLLC

(57) ABSTRACT

A steering column assembly that includes a rake bracket and a rake bolt assembly. The rake bracket is disposed on a jacket assembly that extends along a steering column axis. The rake bracket defines an opening and rake bracket teeth. The rake bolt assembly includes a rake bolt that extends through the opening along a rake bolt axis and a rake element that is disposed about the rake bolt. The rake element has a toothed region defining rake teeth that engage the first rake bracket teeth and a non-toothed region defining a flag.

12 Claims, 3 Drawing Sheets

(56) References Cited

U.S. PATENT DOCUMENTS

| | | | | |
|---|---|---|---|---|
| 7,635,149 | B2* | 12/2009 | Menjak | B62D 1/184 280/775 |
| 7,685,903 | B2* | 3/2010 | Streng | B62D 1/184 74/492 |
| 7,752,940 | B2* | 7/2010 | Lutz | B62D 1/184 280/775 |
| 7,861,615 | B2* | 1/2011 | Harris | B62D 1/187 280/775 |
| 8,006,587 | B2* | 8/2011 | Schnitzer | B62D 1/184 74/493 |
| 8,327,733 | B2* | 12/2012 | Ozsoylu | B62D 1/184 280/775 |
| 8,413,541 | B2* | 4/2013 | Davies | B62D 1/184 280/777 |
| 8,474,869 | B2* | 7/2013 | Sulser | B62D 1/184 280/775 |
| 8,505,408 | B2* | 8/2013 | Havlicek | B62D 1/195 280/775 |
| 8,555,745 | B2* | 10/2013 | Inoue | B62D 1/195 280/775 |
| 8,657,338 | B2* | 2/2014 | Buzzard | B62D 1/184 280/775 |
| 8,671,795 | B2* | 3/2014 | Ozsoylu | B62D 1/184 74/493 |
| 8,783,717 | B2* | 7/2014 | Tinnin | B62D 1/195 280/777 |
| 8,827,311 | B2* | 9/2014 | Schnitzer | B62D 1/18 280/775 |
| 9,108,673 | B2* | 8/2015 | Streng | B62D 1/184 |
| 9,187,116 | B2* | 11/2015 | Yokota | B62D 1/192 |
| 9,446,781 | B2* | 9/2016 | Tanaka | B62D 1/187 |
| 9,469,330 | B2* | 10/2016 | Tanaka | B62D 1/184 |
| 9,487,229 | B2* | 11/2016 | Hahn | B62D 1/184 |
| 9,545,943 | B2* | 1/2017 | Sakuda | B62D 1/185 |
| 9,580,100 | B2* | 2/2017 | Tomiyama | B62D 1/187 |
| 9,604,663 | B2* | 3/2017 | Tomiyama | B62D 1/187 |
| 9,623,895 | B2* | 4/2017 | Johta | B62D 1/195 |
| 9,623,898 | B2* | 4/2017 | Sakuda | B62D 1/185 |
| 9,718,490 | B2* | 8/2017 | Tanaka | B62D 1/184 |
| 9,764,757 | B2* | 9/2017 | Buzzard | B62D 1/184 |
| 9,840,269 | B2* | 12/2017 | Tanaka | B62D 1/189 |
| 9,840,270 | B2* | 12/2017 | Tomiyama | B62D 1/184 |
| 10,005,485 | B2* | 6/2018 | Kurz | B62D 1/184 |
| 10,196,080 | B2* | 2/2019 | Kim | B62D 1/184 |
| 10,202,139 | B2* | 2/2019 | Tanaka | B62D 1/184 |
| 2004/0035238 | A1* | 2/2004 | Jolley | B62D 1/184 74/493 |
| 2004/0261565 | A1* | 12/2004 | Uphaus | B62D 1/184 74/493 |
| 2008/0178702 | A1* | 7/2008 | Lutz | B62D 1/184 74/493 |
| 2010/0275721 | A1* | 11/2010 | Davies | B62D 1/184 74/493 |
| 2011/0041642 | A1* | 2/2011 | Havlicek | B62D 1/184 74/493 |
| 2011/0185839 | A1* | 8/2011 | Inoue | B62D 1/184 74/493 |
| 2017/0203780 | A1* | 7/2017 | Davies | B62D 1/184 |
| 2017/0313345 | A1* | 11/2017 | Tanaka | B62D 1/184 |

* cited by examiner

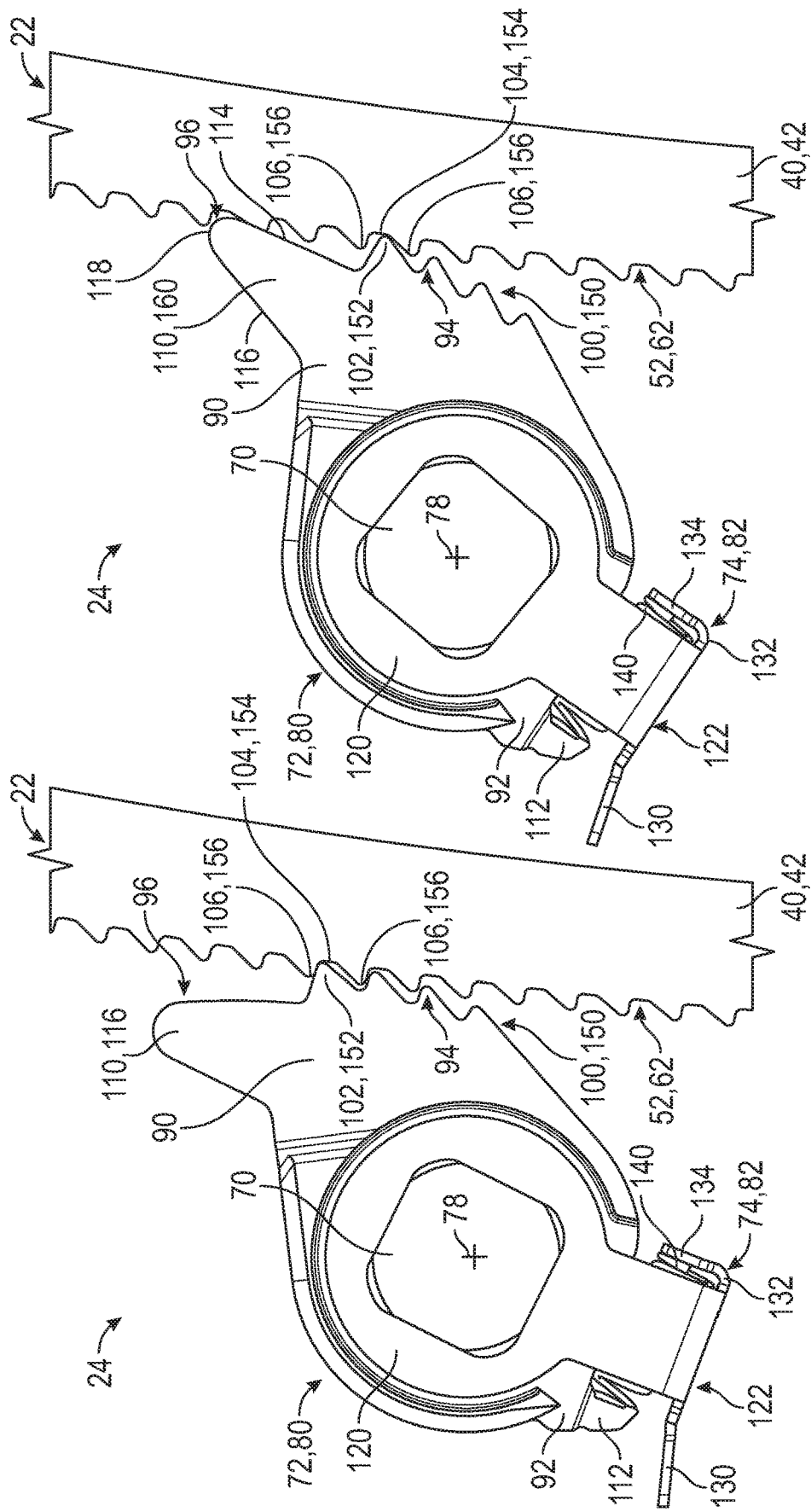

STEERING COLUMN POSITIVE LOCK MECHANISM

BACKGROUND

During a vehicle impact event a steering column may be maintained in a vertical position to facilitate in the collapsing of the steering column. During some vehicle impact events, vertical loading on the steering column may lead to the steering column rotating up or down.

SUMMARY

Disclosed is a steering column assembly that includes a rake bracket and a rake bolt assembly. The rake bracket is disposed on a jacket assembly that extends along a steering column axis. The rake bracket defines an opening and rake bracket teeth. The rake bolt assembly includes a rake bolt that extends through the opening along a rake bolt axis and a rake element that is disposed about the rake bolt. The rake element has a toothed region defining rake teeth that engage the first rake bracket teeth and a non-toothed region defining a flag.

Also disclosed is a steering column assembly that includes a rake bracket and a rake bolt assembly. The rake bracket has a first arm and a second arm. The first arm defines a first opening and first rake bracket teeth that are spaced apart from the first opening. The rake bolt assembly comprising a rake bolt that extends through the first opening along a rake bolt axis and a first rake element that extends from the rake bolt. The first rake element defines first rake teeth that engage the first rake bracket teeth and a first flag that is spaced apart from the first rake teeth.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a partial view of the rake bolt assembly in a first position prior to a vehicle impact; and FIG. 3 is a partial view of the rake bolt assembly in a second position during or after a vehicle impact.

DETAILED DESCRIPTION

Referring now to the Figures, where the present disclosure will be described with reference to specific embodiments, without limiting same, it is to be understood that the disclosed embodiments are merely exemplary of the present disclosure that is embodied in various and alternative forms. The figures are not necessarily to scale; some features is exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
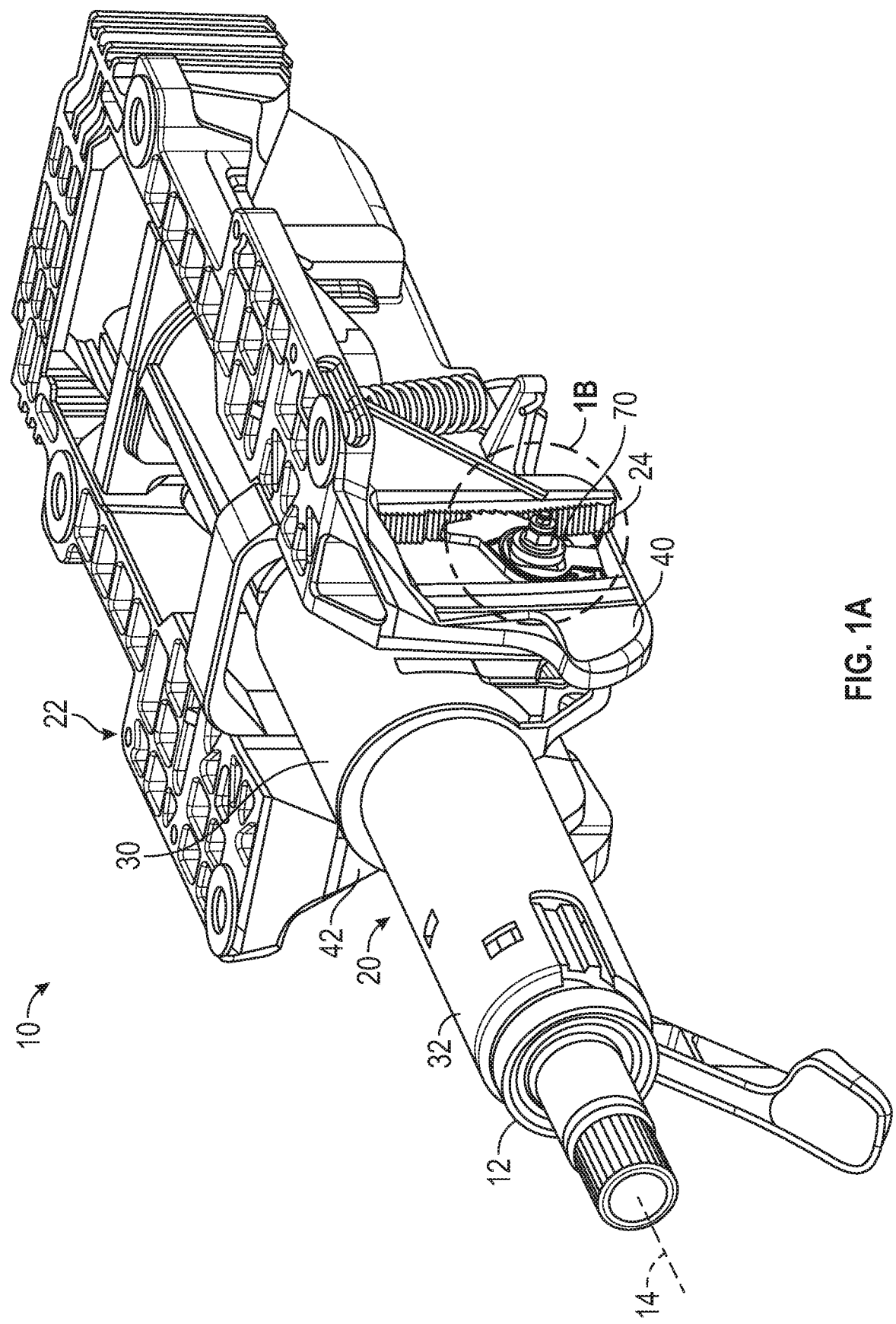
FIGS. 1A and 1B are perspective views of a steering column assembly having a rake bolt assembly.
Figure 1B:
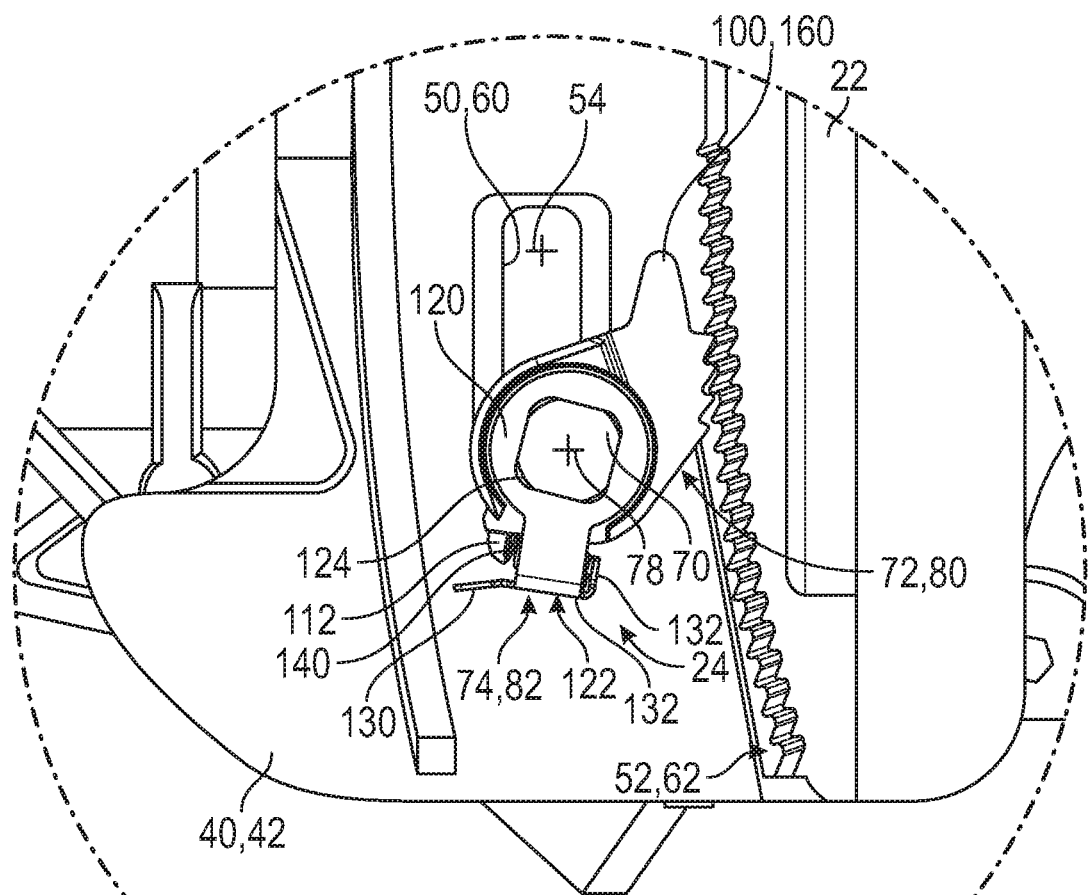

Referring to FIGS. 1A and 1B, an exemplary steering column assembly 10 is shown. The steering column assembly 10 is provided with a steering shaft 12 that extends longitudinally along a steering column axis 14. The steering column assembly 10 includes a jacket assembly 20, a rake bracket 22, and a rake bolt assembly 24.

The jacket assembly 20 includes a first jacket assembly 30 and a second jacket assembly 32. The first jacket assembly 30 extends longitudinally along the steering column axis 14. The second jacket assembly 32 extends longitudinally along the steering column axis 14 and is movably disposed within and relative to the first jacket assembly 30. The steering shaft 12 extends through the first jacket assembly 30 and the second jacket assembly 32.

The rake bracket 22 is at least partially disposed about or disposed on the jacket assembly 20. The rake bracket 22 may be a mounting bracket that operatively connects the jacket assembly 20 to a vehicle structure. The rake bracket 22 includes a first arm 40 and a second arm 42 that is spaced apart from the first arm 40. The first arm 40 and the second arm 42 are disposed on opposite sides of the jacket assembly 20.

The first arm 40 defines a first opening 50 and first rake bracket teeth 52. The first opening 50 extends through the first arm 40 along an axis 54 that is disposed transverse to the steering column axis 14. The first rake bracket teeth 52 are spaced apart from the first opening 50. The first rake bracket teeth 52 are defined on a surface of the rake bracket 22 that faces towards an operator of the vehicle that incorporates the steering column assembly 10.

The second arm 42 defines a second opening 60 and second rake bracket teeth 62. The second opening 60 extends through the second arm 42 along the axis 54. The second rake bracket teeth 62 are spaced apart from the second opening 60. The second rake bracket teeth 62 are defined on a surface of the rake bracket 22 that faces towards an operator the vehicle that incorporates the steering column assembly 10.

The rake bolt assembly 24 is disposed on or within a receiving region of each of the first arm 40 and the second arm 42. The rake bolt assembly 24 is arranged to engage the rake bracket teeth of the rake bracket 22 to inhibit a raking movement or pitching movement of the steering column assembly 10 during a vehicle impact event such that the rake bolt assembly 24 provides an improved steering column positive lock mechanism.

Referring to FIGS. 1A, 1B, 2, and 3, the rake bolt assembly 24 includes a rake bolt 70, a first rake element 72, and a first mounting member 74. The first rake element 72 and the first mounting member 74 are disposed proximate the first arm 40 of the rake bracket 22. The rake bolt assembly 24 also includes a second rake element 80 having a substantially similar configuration as the first rake element 72 and a second mounting member 82 having a substantially similar configuration as the first mounting member 74. The second rake element 80 and the second mounting member 82 are disposed proximate the second arm 42 of the rake bracket 22.

The rake bolt 70 extends through the first opening 50 and the second opening 60 along a rake bolt axis that is disposed coaxial or parallel to the axis 54.

The first rake element 72 may be disposed about the rake bolt 70 or may extend from the rake bolt 70. In at least one embodiment, the first rake element 72 may be integrally formed with an end of the rake bolt 70. The first rake element 72 extends between a first rake element end 90 and a second rake element end 92 that is disposed opposite the first rake element end 90.

The first rake element end 90 defines a toothed region 94 and a non-toothed region 96 extending from the toothed region 94. The toothed region 94 defines first rake teeth 100 that are arranged to engage the first rake bracket teeth 52, as shown in FIG. 2.

At least one rake tooth 102 of the first rake teeth 100 is arranged to displace material of a bottom land 104 between adjacent teeth 106 of the first rake bracket teeth 52 responsive to rotation of the first rake element 72 about the rake bolt axis 78 towards the first rake bracket teeth 52. At least one rake tooth 102 of the first rake teeth 100 may be referred to as a digger tooth that digs into the material of the rake bracket 22 upon which the first rake bracket teeth 52 are formed and deforms the bottom land 104. The digging of at least one rake tooth 102 of the first rake teeth 100 into the first rake bracket teeth 52 improves the vertical holding load of the steering column assembly 10. The vertical holding load increases due to the additional camming that takes advantage of the compressive strength of the respective materials of the first rake element 72 and the first rake bracket teeth 52 of the rake bracket 22.

The non-toothed region 96 is spaced apart from the toothed region 94. The non-toothed region 96 defines a first flag 110 extending outwardly therefrom. The first flag 110 is arranged to engage the first rake bracket teeth 52 to inhibit further rotation of the first rake element 72 about the rake bolt axis 78, as shown in FIG. 3. The engagement of the first flag 110 with the first rake bracket teeth 52 prevents over rotation or over camming of the first rake element 72 such that at least one rake tooth 102 of the first rake teeth 100 stays in contact with the first rake bracket teeth 52 during and after the vehicle impact event.

The first flag 110 includes a first surface 114, a second surface 116, and a tip surface 118 extending between the first surface 114 and the second surface 116. The first surface 114 extends from the toothed region 94 and faces towards the first rake bracket teeth 52. The first surface 114 is a generally planar surface not provided with teeth. The first surface 114 is arranged to engage the first rake bracket teeth 52 responsive to rotation of the first rake element 72 and/or the rake bolt 70 rotating about the rake bolt axis 78 during a vehicle impact event. The second surface 116 is disposed opposite the first surface 114. The first surface 114 and the second surface 116 become progressively closer to each other in a direction that extends from the toothed region 94 towards the tip 118, such that a base of the first flag 110 has a thickness that is greater than a thickness proximate the tip surface 118. The greater thickness near the base of the first flag increases the strength of the first flag 110 to inhibit fracture or failure of the first flag 110 during a vehicle impact event in which the first surface 114 of the first flag 110 engages the first rake bracket teeth. The tip surface 118 extends between distal ends of the first surface 114 and the second surface 116. The tip surface 118 may have a generally rounded form.

The second rake element end 92 defines a tab 112. The tab 112 is disposed opposite the first rake teeth 100. In at least one embodiment, the tab 112 may be defined by the rake bolt 70 or a portion of the first rake element 72.

The first mounting member 74 may be at least partially disposed within the first rake element 72. The first mounting member 74 includes a mounting member body 120 and a mounting member extension 122. The mounting member body 120 extends into at least one of the rake bolt 70 and the first rake element 72. The mounting member body 120 may define an opening 124. The rake bolt 70 may extend through the opening 124.

The mounting member extension 122 extends from the mounting member body 120. The mounting member extension 122 includes a first portion 130 and a second portion 132 that extends from the first portion 130. The second portion 132 is disposed generally perpendicular to the first portion 130. The second portion 132 includes a lip or retention surface 134 that is disposed perpendicular to the second portion 132.

A first biasing member 140 extends between the tab 112 of the first rake element 72 and the retention surface 134 of the second portion 132 of the mounting member extension 122. The first biasing member 140 may bias or apply a biasing force to the tab 112 of the first rake element 72 to urge the first rake teeth 100 towards engagement with the first rake bracket teeth 52.

The second rake element 80 has a substantially similar configuration as the first rake element 72. The second rake element 80 includes a toothed region that defines second rake teeth 150 that are arranged to engage the second rake bracket teeth 62. At least one rake tooth 152 of the second rake teeth 150 is arranged to displace material of the bottom land 154 between adjacent teeth 156 of the second rake teeth 150 responsive to rotation of the second rake element 80 about the rake bolt axis 78 towards the second rake bracket teeth 62.

The second rake element 80 includes a non-toothed region that defines a second flag 160 that is spaced apart from the second rake teeth 150. The second flag 160 is arranged to engage a tooth of the second rake bracket teeth 152 inhibit further rotation of the second rake element 80 about the rake bolt axis 78.

The digging in or camming of at least one tooth of the first rake teeth 100 of the first rake element 72 into the first rake bracket teeth 52 and the digging in or camming of at least one tooth of the second rake teeth 150 of the second rake element 80 into the second rake bracket teeth 62 increases the capability of the steering column assembly 10 to withstand vertical loading and maintain a steering column assembly 10 position during a vehicle impact event. The first flag 110 of the first rake element 72 inhibits the first rake element 72 from over rotating or over-camming to ensure that the at least one tooth of the first rake teeth 100 of the first rake element 72 remains engaged with the first rake bracket teeth 52. The second flag 160 of the second rake element 80 inhibits the second rake element 80 from over rotating or over-camming to ensure that at least one tooth of the second rake teeth 150 of the second rake element 80 remains engaged with the second rake bracket teeth 62.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A steering column assembly comprising:
a rake bracket disposed on a jacket assembly that extends along a steering column axis, the rake bracket defining an opening and rake bracket teeth; and
a rake bolt assembly comprising a rake bolt that extends through the opening along a rake bolt axis and a rake element that is disposed about the rake bolt, the rake element having a toothed region defining rake teeth that engage the rake bracket teeth and a non-toothed region defining a flag, wherein at least one rake tooth of the rake teeth is arranged to displace material of a bottom land between adjacent teeth of the rake bracket teeth responsive to rotation of the rake element about the rake bolt axis towards the rake bracket teeth.

2. The steering column assembly of claim 1, wherein the rake bolt axis is disposed transverse to the steering column axis.

3. The steering column assembly of claim 1, wherein the flag is arranged to engage the rake bracket teeth to inhibit further rotation of the rake element about the rake bolt axis.

4. The steering column assembly of claim 1, wherein the rake bolt assembly further comprising a mounting member that includes a mounting member body and a mounting member extension.

5. The steering column assembly of claim 4, wherein the mounting member body extends into the rake bolt.

6. The steering column assembly of claim 4, wherein at least one of the rake bolt and the rake element defines a tab that is disposed opposite the rake teeth.

7. The steering column assembly of claim 6, wherein the rake bolt assembly further comprising a biasing member that extends between the mounting member extension and the tab.

8. A steering column assembly comprising:
a rake bracket having a first arm and a second arm, the first arm defining a first opening and first rake bracket teeth that are spaced apart from the first opening; and
a rake bolt assembly comprising a rake bolt that extends through the first opening along a rake bolt axis and a first rake element that extends from the rake bolt, the first rake element defining first rake teeth that engage the first rake bracket teeth and a first flag that is spaced apart from the first rake teeth, wherein at least one rake tooth of the first rake teeth is arranged to displace material of a bottom land between adjacent teeth of first rake bracket teeth responsive to rotation of the first rake element about the rake bolt axis towards the first rake bracket teeth.

9. The steering column assembly of claim 8, wherein the first flag is arranged to engage the first rake bracket teeth to inhibit further rotation of the rake element about the rake bolt axis.

10. A steering column assembly comprising:
a rake bracket having a first arm and a second arm, the first arm defining a first opening and first rake bracket teeth that are spaced apart from the first opening; and
a rake bolt assembly comprising a rake bolt that extends through the first opening along a rake bolt axis and a first rake element that extends from the rake bolt, the first rake element defining first rake teeth that engage the first rake bracket teeth and a first flag that is spaced apart from the first rake teeth, wherein the second arm is spaced apart from the first arm, the second arm defines a second opening and second rake bracket teeth that are spaced apart from the second opening, wherein the rake bolt assembly further comprising a second rake element that extends from the rake bolt, the second rake element defining second rake teeth that engage the second rake bracket teeth and a second flag that is spaced apart from the second rake teeth, wherein at least one rake tooth of the second rake teeth is arranged to displace material of a bottom land between adjacent teeth of second rake bracket teeth responsive to rotation of the second rake element about the rake bolt axis towards the second rake bracket teeth.

11. The steering column assembly of claim 10, wherein the rake bolt extends through the second opening along the rake bolt axis.

12. The steering column assembly of claim 10, wherein the second flag is arranged to engage the second rake bracket teeth to inhibit further rotation of the second rake element about the rake bolt axis.

\* \* \* \* \*